H. HESS.
BALL BEARING.
APPLICATION FILED FEB. 21, 1911.
1,071,739.
Patented Sept. 2, 1913.
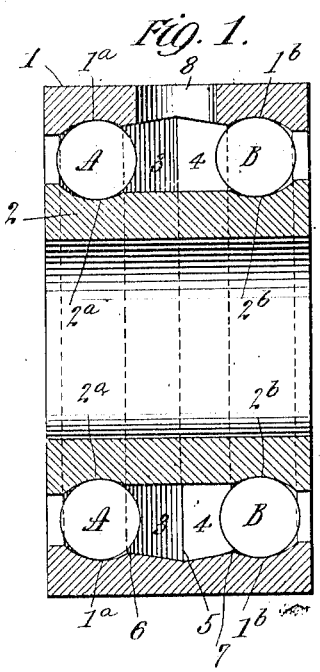
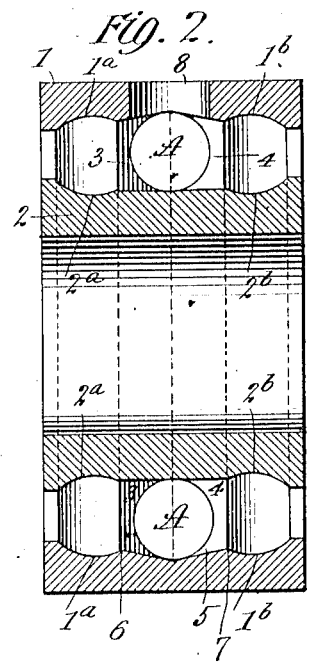
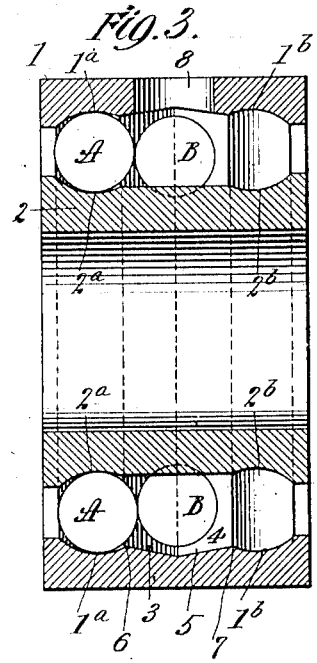
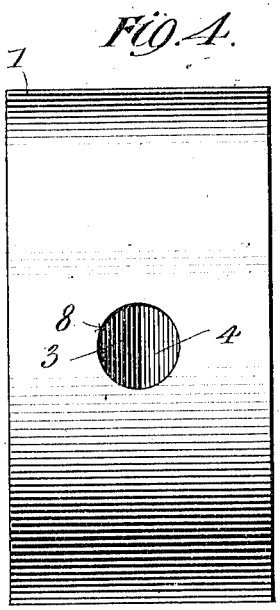
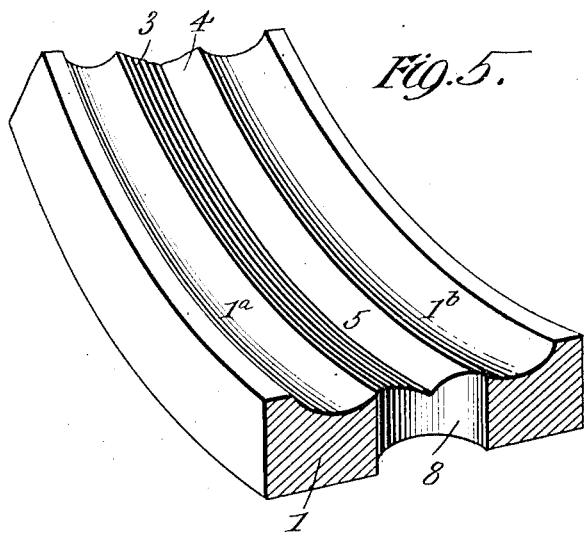
Inventor
HENRY HESS

UNITED STATES PATENT OFFICE.

HENRY HESS, OF PHILADELPHIA, PENNSYLVANIA, ASSIGNOR TO THE HESS-BRIGHT MANUFACTURING COMPANY, OF PHILADELPHIA, PENNSYLVANIA, A CORPORATION OF DELAWARE.

BALL-BEARING.

1,071,739.

Specification of Letters Patent.

Patented Sept. 2, 1913.

Application filed February 21, 1911. Serial No. 610,029.

*To all whom it may concern:*

Be it known that I, HENRY HESS, a citizen of the United States, residing at Philadelphia, in the county of Philadelphia and State of Pennsylvania, have invented certain new and useful Improvements in Ball-Bearings, of which the following is a specification, reference being had therein to the accompanying drawing.

This invention relates to ball bearings and more particularly to that class thereof provided with continuous and uninterrupted tracks or ways which offer no impediment or obstruction to the travel of the balls thereon, and whereby the several parts are held in assembled relations, thus constituting a bearing of the unit-handling type. The present improvement contemplates the provision of the bearing with certain additional features which facilitate the assemblage and also possess other advantages as will hereafter appear. Bearings of the unit-handling type and provided with uninterrupted tracks, are assembled in various ways, among which may be mentioned the employment of eccentric displacement according to the well known Conrad invention. This procedure, namely, eccentric displacement, is ordinarily followed for the introduction of substantially less than the full complement of balls, after which, if additional ones are desired, they may be inserted by other means, such as non-full depth filling openings in the ring and the like. My present invention, however, contemplates the complete assemblage of all the balls at one time or of the balls individually, and this even in the case of a full type bearing where the raceway is entirely or almost filled with balls. To this end, I provide on at least one of the rings at the side of its track or way, a circumferentially extending tapered surface, which facilitates the passage of the balls into the raceway between the rings, and in connection with this tapered surface, I provide the ring with a filling opening extending through the ring between its side edges, which opening communicates with the space between the tapered surface and the surface of the opposing ring, so that the balls may be assembled in proximity to the tapered surface preparatory to their being forced thereover into the raceway.

In the accompanying drawings, I have illustrated this improved construction in connection with a two-series bearing, that is, a bearing in which there are two series of load carrying balls traveling in two raceways between the rings, there being provided in accordance with my invention, two circumferentially extending tapered surfaces extending entirely around the ring at the inner sides respectively of the ball tracks thereon, and forming a circumferential space between the ball tracks, the filling opening in the ring extending through the same and leading to such circumferential space. It is to be understood, however, that but one tapered surface may be employed, and further that such surface need not extend entirely around the ring, the essential feature of the invention in this connection being the provision, in connection with a tapered circumferentially extending surface at the side of the ball track, of a filling opening for the balls which extends entirely through the ring and in proximity to the tapered surface. In cases where the tapered surface extends entirely around the ring, the balls may be introduced one at a time through the filling opening and the entire series assembled against the tapered surface, whereupon the whole series may be forced as a unit over the tapered surface and seated at one operation in the adjoining raceway. If, on the other hand, the tapered surface extends only partially around the ring, or, in other words, in a circumferential direction, then a portion only of the complete series may be forced into the raceway by one operation after having been assembled adjacent the tapered surfaces. Or, again, the balls may be forced individually and in succession over the tapered surfaces, and this whether the tapered surface is continuous or only partially so.

In the accompanying drawings: Figure 1 is a longitudinal section through a two-series ball bearing, having my invention embodied therein. Fig. 2 is a similar view showing how the balls of the first series are assembled preparatory to their forced introduction into the raceway. Fig. 3 is a similar view showing the first series of balls in place in the raceway, and the second series in position preparatory to being forced into its raceway. Fig. 4 is a plan view of the bearing showing the filling openings. Fig. 5 is a perspective view of the inner surface of one of the rings showing the form and relation of the tapered surfaces.

Referring to the drawings: In the particular form illustrated in the drawings, the bearing comprises an outer ring 1, an inner ring 2 formed respectively with two uninterrupted tracks or ways $1^a$ and $1^b$ and $2^a$ and $2^b$, forming between the rings two raceways, in which are two series of balls A and B. One of the rings, the outer ring 1 in the present instance, is provided at the inner sides of its tracks, with two circumferentially extending surfaces 3 and 4, which are tapered or sloped in opposite directions, forming a circumferential groove in the ring midway between its ball tracks, and forming in connection with the adjacent surface of the opposing ring, a circumferential space 5 extending continuously therearound. The outer edges of the sloping surfaces terminate a considerable distance inward in a longitudinal direction, of the central or deepest line of the tracks, and some distance inward in a radial direction of the deepest portion of the tracks, thus constituting in effect ribs 6 and 7 at the inner sides of the two series of balls respectively whereby the parts are held in proper operative relations after they are assembled.

Extending radially through the outer ring and leading into the circumferential space 5, is a filling opening 8 circular in cross-section and of a diameter to permit the balls to be passed one at a time freely therethrough, the outer edges of the filling opening at diametrically opposite sides terminating on a line coincident with the outer edges of the sloping surfaces.

In assembling the balls in their raceways, they may be introduced individually into their respective raceways by forcing them in succession over the shoulders at the sides of the tracks or ways after having been first passed through the radial filling opening. A more speedy procedure, however, is to force the entire series as a unit into its raceway. This may be accomplished by first introducing the balls of one series in succession through the filling opening and assembling them as shown in Fig. 2 in the circumferential space 5 and against the tapered surface at the side of the raceway in which the balls are to be assembled. By means of a suitably formed tool introduced between the rings from the opposite side, the entire row of balls may be forced to the left and over the sloping surface 3 into its raceway, as shown in Fig. 3. The other series of balls is now introduced through the filling opening and assembled in the circumferential space and against the sloping surface 4 at the right, as in Fig. 3, and by a suitable tool, or a series of tools, which may be introduced from the opposite side and between the balls of the first series, all of the balls of the second series may be forced over the sloping surface 4 and into its raceway.

In the accompanying drawings I have shown my invention in the specific form which I prefer to adopt, but it will be understood that the invention is not limited to any particular form or construction of the parts except in so far as such limitations are specified in the claims.

Having thus described my invention, what I claim is:—

1. In a ball bearing, the combination of inner and outer rings, each formed with a continuous and uninterrupted track or way forming a raceway, and the balls mounted therein, one of said rings being provided at one side of its track or way with a circumferentially extending inclined or tapered surface forming in connection with the opposing ring, a circumferential groove for the temporary assemblage of balls preparatory to their being forced over the inclined surface into said raceway, and the said ring being provided with a filling opening extending entirely through the same in a direction transverse to the axis of the ring and leading to the said circumferential groove; whereby the balls introduced through the filling opening may be assembled on the circumferential inclined surface and then forced thereover into the raceway.

2. In a ball bearing, the combination of the inner and outer rings, each formed with a continuous and uninterrupted track or way forming a raceway, and the balls mounted therein, the outer ring being provided at one side of its track or way with a circumferentially extending inclined or tapered surface forming in connection with the inner ring, a circumferential groove for the temporary assemblage of balls preparatory to their being forced over the inclined surface into the raceway, and the said outer ring being provided with a filling opening extending entirely therethrough in a direction transverse to the axis of the ring and leading to the said circumferential groove; whereby the balls introduced through the filling opening may be assembled on the circumferential inclined surface and then forced thereover into the raceway.

3. In a ball bearing, the combination of the inner and outer rings, each formed with two continuous and uninterrupted tracks or ways forming two raceways between the rings, and two series of balls mounted therein, one of said rings being provided between its tracks or ways with two circumferentially extending inclined or tapered surfaces forming in connection with the opposing ring a circumferential groove sloping in opposite directions toward the respective raceways, the said ring being further provided with a filling opening extending entirely through it at a point between its tracks or ways and communicating with said circumferential groove; whereby the two series of balls may be assembled in succession respectively against the tapered surfaces leading to the two raceways; and then forced over the said surfaces into the adjacent raceway.

In testimony whereof I affix my signature in presence of two witnesses.

HENRY HESS.

Witnesses:
  GEO. M. HENRIE,
  C. T. MCCALLA.